United States Patent
McCombs

(10) Patent No.: US 10,557,519 B2
(45) Date of Patent: Feb. 11, 2020

(54) AUTOMOTIVE FLYWHEEL WITH FINS TO INCREASE AIRFLOW THROUGH CLUTCH, AND HEAT MANAGEMENT METHOD

(71) Applicant: Accel Performance Group LLC, Bowling Green, KY (US)

(72) Inventor: Ross A. McCombs, Oskaloosa, IA (US)

(73) Assignee: Accel Performance Group LLC, Bowling Green, KY (US)

( * ) Notice: Subject to any disclaimer, the term of this patent is extended or adjusted under 35 U.S.C. 154(b) by 226 days.

(21) Appl. No.: 15/585,814

(22) Filed: May 3, 2017

(65) Prior Publication Data
US 2017/0234402 A1    Aug. 17, 2017

Related U.S. Application Data

(63) Continuation of application No. 15/338,573, filed on Oct. 31, 2016, now Pat. No. 9,739,343, which is a
(Continued)

(51) Int. Cl.
*F16F 15/30* (2006.01)
*F16D 13/72* (2006.01)
*B23P 15/14* (2006.01)

(52) U.S. Cl.
CPC ............ *F16F 15/302* (2013.01); *B23P 15/14* (2013.01); *F16D 13/72* (2013.01); *F16F 15/30* (2013.01);
(Continued)

(58) Field of Classification Search
CPC ........... Y10T 74/2132; F16D 2300/021; F16D 13/72; F16F 15/302; F16F 15/30; F16F 2226/00; B23P 15/14
See application file for complete search history.

(56) References Cited

U.S. PATENT DOCUMENTS

| 157,272 A | 12/1874 | Conger |
| 603,094 A | 4/1898 | Worth |

(Continued)

FOREIGN PATENT DOCUMENTS

| DE | 202015009048 | 9/2016 |
| WO | 2015066500 | 7/2015 |

OTHER PUBLICATIONS

U.S. Appl. No. 15/495,492, Bellhousing Alignment Device and Method, filed Apr. 24, 2017, Filed/Pending.
(Continued)

*Primary Examiner* — Lee A Holly
(74) *Attorney, Agent, or Firm* — Middleton Reutlinger

(57) ABSTRACT

A flywheel for use in an automobile between an engine and a clutch assembly is provided. The flywheel is a circular member having an engine side and an opposite clutch side. An aperture is formed in the circular member having an axis, and the aperture is used to operatively attach the flywheel to the engine. A plurality of clutch fins and/or grooves are formed on the clutch side adjacent the outer edge of the circular member and spaced radially about the axis of the aperture of the flywheel. The clutch fins have a face that is generally coplanar with the clutch side of the circular member. The fins and grooves work to cool the internal components of the engine. Optionally, a second set of grooves and fins may be formed on the engine side of the flywheel to further aid in cooling the clutch disc and other engine components.

19 Claims, 4 Drawing Sheets

Related U.S. Application Data continuation of application No. 13/358,781, filed on Jan. 26, 2012, now Pat. No. 9,482,308.

(60) Provisional application No. 61/436,404, filed on Jan. 26, 2011.

(52) U.S. Cl.
CPC .... *F16D 2300/021* (2013.01); *F16F 2226/00* (2013.01); *Y10T 74/2132* (2015.01)

(56) References Cited

U.S. PATENT DOCUMENTS

| | | |
|---|---|---|
| 1,011,000 A | 12/1911 | Worth et al. |
| 1,749,917 A | 3/1930 | Meadowcroft |
| 1,824,440 A | 9/1931 | Meyer |
| 2,062,102 A | 12/1932 | Nutt et al. |
| 2,060,773 A | 1/1933 | Pearmain |
| 1,899,274 A | 2/1933 | Hook et al. |
| 1,939,356 A | 12/1933 | Lindgren |
| 2,091,409 A | 8/1937 | Lewis |
| 2,107,954 A | 2/1938 | Morton et al. |
| 2,126,149 A | 8/1938 | Spase |
| 2,674,216 A | 4/1954 | Griffin |
| 2,746,163 A | 5/1956 | Mortiz |
| 2,752,675 A | 7/1956 | Bauer |
| 2,825,129 A | 3/1958 | Hempel |
| 2,932,890 A | 4/1960 | Sporck et al. |
| 2,982,150 A | 5/1961 | Kolbe |
| 3,027,960 A | 4/1962 | Ditel |
| 3,072,086 A | 1/1963 | Birchfield et al. |
| 3,075,691 A | 1/1963 | Kelley |
| 3,090,475 A | 5/1963 | Gatewood et al. |
| 3,104,640 A | 9/1963 | Sporck et al. |
| 3,114,342 A | 12/1963 | Sporck et al. |
| 3,187,534 A | 6/1965 | Serope |
| 3,205,688 A | 9/1965 | Paulton |
| 3,222,765 A | 12/1965 | Parent et al. |
| 3,316,745 A | 5/1967 | Berghahn et al. |
| 3,342,051 A | 9/1967 | Leszak |
| 3,355,920 A | 12/1967 | Ellenburg |
| 3,391,439 A | 7/1968 | Bulgrin |
| 3,603,435 A | 9/1971 | Buzzard |
| 3,667,581 A | 6/1972 | Hanks |
| 3,696,689 A | 10/1972 | Senter et al. |
| 3,772,938 A | 11/1973 | Johnson |
| 3,809,192 A | 5/1974 | Stehle |
| 3,841,290 A | 10/1974 | Shubeck |
| 4,016,642 A | 4/1977 | Kraft et al. |
| 4,041,746 A | 8/1977 | Kraft |
| 4,050,321 A | 9/1977 | Kraft |
| 4,055,976 A | 11/1977 | Kraft |
| 4,056,291 A | 11/1977 | Kraft et al. |
| 4,109,542 A | 8/1978 | Kraft |
| 4,254,541 A | 3/1981 | St. John |
| 4,289,008 A | 9/1981 | Steele |
| 4,294,343 A | 10/1981 | Reh |
| 4,478,593 A | 10/1984 | Brown |
| 4,528,734 A | 7/1985 | Beyer |
| 4,579,604 A | 4/1986 | Beyer |
| 4,580,673 A | 4/1986 | Graton |
| 4,599,769 A | 7/1986 | Latzko et al. |
| 4,606,206 A | 8/1986 | Daudi |
| 4,641,547 A | 2/1987 | Stich et al. |
| 4,674,616 A | 6/1987 | Mannino, Jr. |
| 4,747,284 A | 5/1988 | Hudson |
| 4,848,080 A | 7/1989 | Hoffmann et al. |
| 4,936,129 A | 6/1990 | Lipper et al. |
| 4,955,343 A | 9/1990 | Ogami |
| 4,989,657 A | 2/1991 | Lipper |
| 5,094,331 A | 3/1992 | Fujimoto et al. |
| 5,150,777 A | 9/1992 | Friedmann |
| 5,203,441 A | 4/1993 | Monette |
| 5,218,849 A | 6/1993 | Sieger et al. |
| 5,226,516 A | 7/1993 | Novikoff et al. |
| 5,267,488 A | 12/1993 | Hardeman et al. |
| 5,279,182 A | 1/1994 | Fukushima |
| 5,351,796 A | 10/1994 | Uenohara |
| 5,384,949 A | 1/1995 | Wodrich et al. |
| 5,404,979 A | 4/1995 | Craft et al. |
| 5,426,964 A | 6/1995 | Sieger |
| 5,473,808 A | 12/1995 | Winters, Sr. |
| 5,531,088 A | 7/1996 | Inatani |
| 5,566,591 A | 10/1996 | Burkett |
| 5,575,367 A | 11/1996 | Romanelli |
| 5,619,879 A | 4/1997 | Friese |
| 5,634,271 A | 6/1997 | Lipper |
| 5,758,532 A | 6/1998 | Massee |
| 5,775,151 A | 7/1998 | Massee |
| 5,782,324 A | 7/1998 | Wall |
| 5,836,431 A | 11/1998 | Jackel |
| 5,845,757 A | 12/1998 | Csonka |
| 5,857,547 A | 1/1999 | Dequesnes |
| 5,896,971 A | 4/1999 | Hein |
| 6,042,935 A | 3/2000 | Krenkel et al. |
| 6,056,099 A | 5/2000 | Jackel et al. |
| 6,065,578 A | 5/2000 | Nakatani et al. |
| 6,189,357 B1 | 2/2001 | Baumgarten et al. |
| 6,199,419 B1 | 3/2001 | Shrayer et al. |
| 6,561,002 B2 | 5/2003 | Okada et al. |
| 6,568,518 B2 | 5/2003 | Sarar |
| 6,601,284 B1 | 8/2003 | Wall |
| 6,694,791 B1 | 2/2004 | Johnson et al. |
| 6,701,617 B2 | 3/2004 | Li et al. |
| 6,705,263 B2 | 3/2004 | Ito et al. |
| 6,731,043 B2 | 5/2004 | Pritchard et al. |
| 6,823,705 B2 | 11/2004 | Fukuda et al. |
| 7,091,635 B1 | 8/2006 | Gilliland et al. |
| 7,097,006 B2 | 8/2006 | Veneziano |
| 7,097,007 B2 | 8/2006 | Lin |
| 7,124,609 B1 | 10/2006 | Hermanson |
| 7,152,446 B2 | 12/2006 | Wada et al. |
| 7,228,629 B2 | 6/2007 | Beyer |
| 7,243,517 B2 | 7/2007 | Sieger |
| 7,798,301 B2 | 9/2010 | Keating et al. |
| 8,146,719 B2 | 4/2012 | Antanaitis et al. |
| 8,561,283 B1 | 10/2013 | McCombs et al. |
| D726,531 S | 4/2015 | Muzic |
| 9,360,100 B2 | 6/2016 | McCombs et al. |
| D760,582 S | 7/2016 | Muzic |
| 9,482,308 B2 | 11/2016 | McCombs |
| 9,518,645 B2 | 12/2016 | McCombs |
| 9,739,343 B2 | 8/2017 | McCombs |
| 2003/0005792 A1 | 1/2003 | Ninomiya et al. |
| 2003/0015058 A1 | 1/2003 | Bell |
| 2003/0145676 A1 | 8/2003 | Bennefous et al. |
| 2004/0040802 A1 | 3/2004 | Veneziano et al. |
| 2005/0010328 A1 | 1/2005 | Ikeda et al. |
| 2006/0090591 A1 | 5/2006 | Graeve |
| 2006/0231369 A1 | 10/2006 | Bassett et al. |
| 2006/0272378 A1 | 12/2006 | Amino et al. |
| 2007/0039366 A1 | 2/2007 | Michel et al. |
| 2008/0179870 A1 | 7/2008 | Theodore |
| 2009/0301153 A1 | 12/2009 | Tachi |
| 2010/0116603 A1 | 5/2010 | Kitchell |
| 2012/0186386 A1 | 7/2012 | McCombs |
| 2012/0186935 A1 | 7/2012 | McCombs |
| 2012/0186936 A1 | 7/2012 | McCombs |
| 2014/0020505 A1 | 1/2014 | McCombs et al. |
| 2015/0122066 A1 | 5/2015 | McCombs |
| 2015/0377304 A1 | 9/2015 | McCombs |
| 2015/0300420 A1 | 10/2015 | Kirchhoffer |
| 2016/0069416 A1 | 3/2016 | Kowalski |
| 2016/0281835 A1 | 9/2016 | McCombs et al. |
| 2017/0045115 A1 | 2/2017 | McCombs |
| 2017/0234402 A1 | 8/2017 | McCombs |

OTHER PUBLICATIONS

Transmittal Letter of Related Cases.
United States Patent and Trademark Office, Office Action for U.S. Appl. No. 15/338,573 dated Dec. 21, 2016.

(56) References Cited

OTHER PUBLICATIONS

United States Patent and Trademark Office, Notice of Allowance for U.S. Appl. No. 15/338,573 dated Apr. 20, 2017.
United States Patent and Trademark Office, Restriction Requirement for U.S. Appl. No. 15/358,781 dated Aug. 15, 2012.
United States Patent and Trademark Office, Office Action for U.S. Appl. No. 15/358,781 dated Sep. 27, 2012.
United States Patent and Trademark Office, Office Action for U.S. Appl. No. 15/358,781 dated Apr. 25, 2013.
United States Patent and Trademark Office, Office Action for U.S. Appl. No. 15/358,781 dated May 4, 2015.
United States Patent and Trademark Office, Office Action for U.S. Appl. No. 15/358,781 dated Aug. 19, 2015.
United States Patent and Trademark Office, Office Action for U.S. Appl. No. 15/358,781 dated Nov. 30, 2015.
United States Patent and Trademark Office, Office Action for U.S. Appl. No. 15/358,781 dated Apr. 14, 2016.
United States Patent and Trademark Office, Notice of Allowance for U.S. Appl. No. 15/358,781 dated Jul. 7, 2016.
Quicktime Inc. Product Listing Dec. 1, 2005 [online] www.quicktimeinc.com/products.html [retrieved on May 10, 2011], Retrieved from Internet Archive http://replay.web.archive.org.
SFI Foundation Inc., "Specification List", www.sfifoundation.com/speclist.html. Printout from Internet Oct. 26, 2007.
Speedway Motors, Explosion-Proof Chevy Bellhousing With Plate; www.speedwaymotors.com/p/545,37, Printout from Internet Oct. 25, 2007.
Definition of "Bell housing", wikipedia page printout from Internet Oct. 28, 2007.
"List of Chrysler bellhousing patterns", wikipedia page printout from Internet Oct. 28, 2007.
Definition of "Hydroforming", wikipedia page printout from Internet Oct. 28, 2007.
Definition of "Metal spinning", wikipedia page printout from Internet Oct. 28, 2007.
Engineers Edge, "Metal Spinning", diagram illustrating "outside" type metal spinning, page printout from Internet Oct. 28, 2007.
GLOBALSPEC, "About Metal Spinning Services" examples of metal spinning, page printout from Internet Oct. 28, 2007.
Utility U.S. Appl. No. 15/495,492 entitled Bellhousing Alignment Device and Method filed Apr. 24, 2017.
Belway B.P. et al. (2006). ASM Handbook, vol. 14B—Metalworking: Sheet Forming . . . ASM International. pp. 367-374.
Tremec Corporation T-56; Tremec Transmissions 2012 Performance Product Guide Mar. 24, 2015. Retrieved from www.archive.org Nov. 2, 2017.

AUTOMOTIVE FLYWHEEL WITH FINS TO INCREASE AIRFLOW THROUGH CLUTCH, AND HEAT MANAGEMENT METHOD

CROSS-REFERENCE TO RELATED APPLICATIONS

This continuation patent application claims priority to and benefit of, under 35 U.S.C. § 120, continuation patent application Ser. No. 15/338,573, filed on Oct. 31, 2016, which claims priority to non-provisional patent application Ser. No. 13/358,781, filed on Jan. 26, 2012, which claims priority to provisional patent application 61/436,404, filed on Jan. 26, 2011, all of which are incorporated by reference herein in their entirety.

TECHNICAL FIELD

The present invention is related to an automobile engine. More particularly, but not exclusively, the invention is related towards an improved flywheel, and method of making the same for providing heat management to an automobile engine.

BACKGROUND OF THE INVENTION

Generally, the starting mechanism for an internal combustion engine such as an automotive engine comprises an electric starting motor, which is engaged via a pinion gear to mating teeth on a flywheel, which in turn is attached to the crankshaft of the engine. When the electric starting motor receives electric current from an electric storage battery, the teeth of the pinion gear on the end of the motor armature shaft are automatically brought into engagement with the teeth of the flywheel, thereby causing the crankshaft to rotate. Once the engine has started, that is, once the engine commences operation via the typical internal combustion cycle, the pinion gear of the starting motor is automatically disengaged, and the flywheel continues to rotate due to the movement of the crankshaft.

A typical flywheel is a substantially solid metal (e.g. steel) cylindrical metal plate spline-fit to the crankshaft, and thus turns with the crankshaft at engine rpm (e.g. usually at least several thousand rpm). The shapes can vary depending on a number of factors including type and manufacturer of the engine or flywheel. The flywheel side facing away from engine usually has at least a substantial smooth surface that interacts with the clutch disc (and any clutch lining on the disc). Because of the frictionally interaction between the clutch and the flywheel, substantial heat is generated.

Additionally, because flywheels are attached to the crankshaft of an engine, heat can be built up in the engine housing and transferred from the flywheel to the clutch assembly. The substantial heat can warp the clutch disc or other parts of the clutch assembly. The warping can cause clutch chatter or degrade the clutch performance. The heat can cause the engine to run inefficiently, or possibly cause clutch failure.

It is therefore a primary object, feature, and/or advantage of the present invention to provide an improved engine flywheel that improves over deficiencies in the art.

It is another object, feature, and/or advantage of the present invention to provide and improved apparatus and method that includes a heat management function integrated into the flywheel.

It is another object, feature, and/or advantage of the present invention to provide and improved apparatus and method that incorporates fins or vanes into one or both sides of an engine flywheel to create a fan effect to cool a clutch assembly and other engine components.

It is another object, feature, and/or advantage of the present invention to provide and improved apparatus and method that mills away material of the flywheel to create the fins or vanes.

It is another object, feature, and/or advantage of the present invention to provide and improved apparatus and method that allows for flexibility in design so that by location, size, angle, or shape the fins or vans can direct air flow in different patterns and speeds into the clutch assembly.

It is another object, feature, and/or advantage of the present invention to provide and improved apparatus and method that meets structural and strength criteria or exceeds the same.

These and/or other objects, features, and advantages of the present invention will be apparent to those skilled in the art. The present invention is not to be limited to or by these objects, features and advantages. No single embodiment need provide each and every object, feature, or advantage.

SUMMARY OF THE INVENTION

The heat management function comprises removing material from the clutch side of the flywheel (side that is needed for interaction with the clutch disc) to form fins or vanes that create air flow towards and around the flywheel and towards and through the clutch when the flywheel rotates. This tends to remove heat from the clutch for heat management of the clutch. Alternatively, the flywheel can be originally manufactured to include raised fins or vanes on that side for the heat management purpose.

To further increase the air flow from the flywheel, additional fins may be milled or formed on the opposite (engine) side of the flywheel. The removal of material will make the flywheel lighter, which makes the automobile lighter, which can improve the overall efficiency of the vehicle. The fins may further be shaped or positioned to create the most airflow possible through the clutch assembly.

According to one aspect of the present invention, an automobile engine flywheel for connecting to an engine and clutch assembly is provided. The flywheel comprises a circular member having an engine side and an opposite clutch side. An aperture is formed through the circular member having an axis, and the aperture is used to operably attach the flywheel to the engine. A plurality of clutch fins are positioned adjacent an outer edge of the clutch side and around the axis of the aperture. The clutch fins have a face that is generally coplanar with the clutch side of the circular member.

According to another aspect of the present invention, a method of manufacturing an engine flywheel for cooling a clutch assembly operably connected to the flywheel is provided. The method includes providing a cylindrical engine flywheel having an engine side configured to be positioned adjacent an engine and a clutch side configured to be positioned adjacent a clutch assembly. An aperture is formed through the flywheel for operably attaching the flywheel to the engine. A plurality of clutch fins are formed on the clutch side of the flywheel to cool the clutch assembly when the crankshaft spins, with the plurality of clutch fins having a face that is generally coplanar with the clutch side of the flywheel.

According to yet another aspect of the present invention, an automobile is provided. The automobile comprises an engine. A flywheel is operably attached to the engine and includes an engine side and a clutch side. The clutch side comprises a plurality of clutch fins positioned adjacent an outer edge of the flywheel spaced radially. A clutch assembly is positioned adjacent the clutch side of the flywheel. The clutch assembly includes a clutch disc, a pressure plate, and a clutch cover. A bell housing is connected to the engine and encloses the flywheel and clutch assembly.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
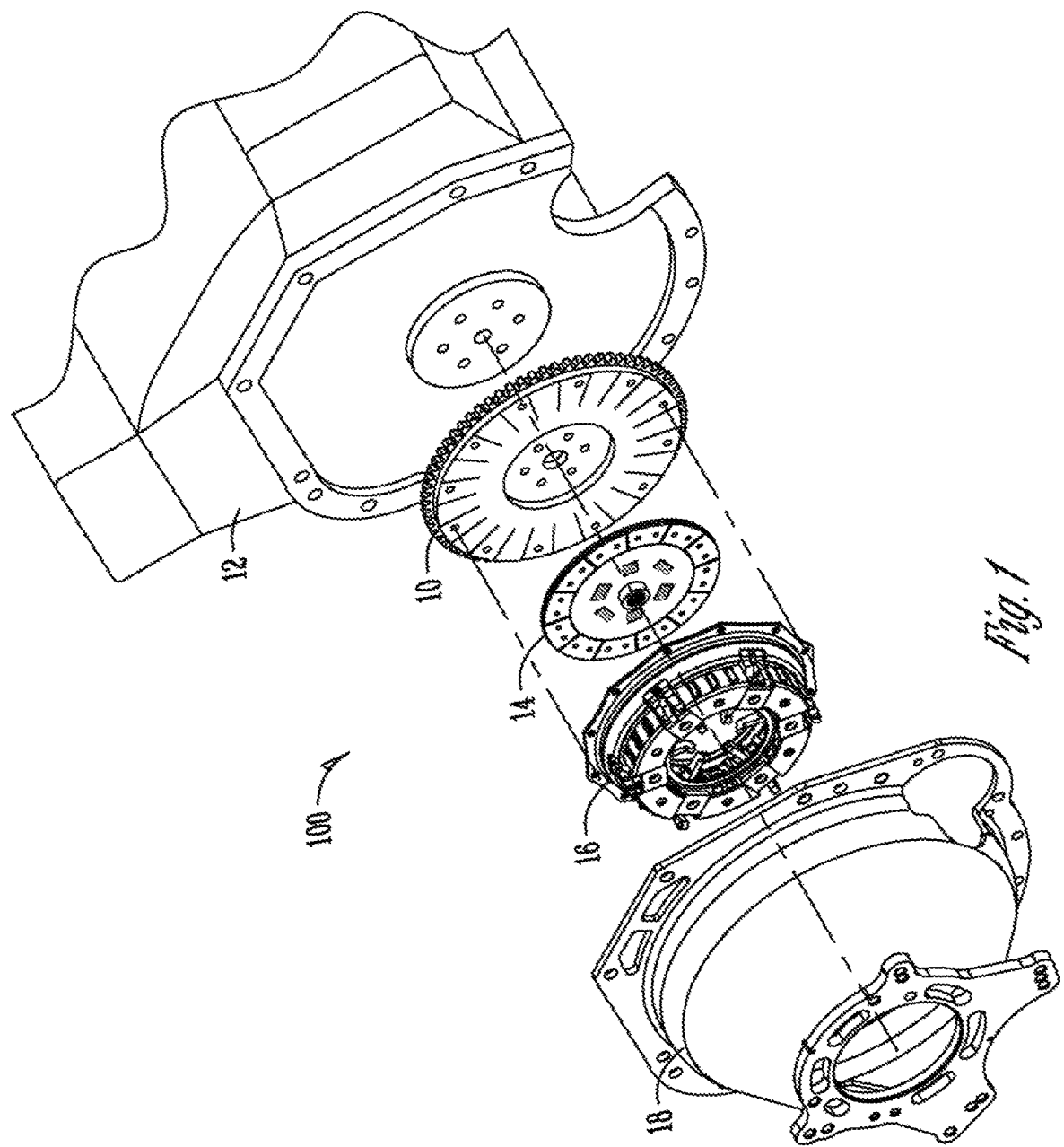
FIG. 1 is an exploded view of components of a vehicle engine, including an engine block, flywheel, clutch assembly, and bell housing.

FIG. 1 is an exploded view of a vehicle engine 100, including an engine block 12, a flywheel 10, a clutch disc 14, a clutch assembly 16 and a bell housing 18. The engine block 12 will include a crank shaft extending outwardly from the engine. However, for purposes of the present invention, the crank shaft has been omitted from the figure. The flywheel 10 is mounted on the crank shaft and attached to the engine block 12. Adjacent the flywheel 10 is a clutch disc 14. The clutch disc 14 is configured to work with the clutch assembly 16. For example, the clutch assembly 16 includes a pressure plate that selectively presses the clutch disc 14 against the flywheel 10. The pressure plate also releases the clutch disc 14 from contact with the flywheel 10 when the automobile is in an idle position. Therefore, the clutch disc 14 and flywheel 10 are in selective engagement. The clutch disc 14 includes a texture that is frictionally connected to the face of the flywheel 10 such that the clutch disc 14 and flywheel 10 will rotate the same rotational velocity when in engagement. The bell housing 18 attaches to the engine block 12, and encloses the flywheel 10, clutch disc 14, and clutch assembly 16. The bell housing 18 provides protection to the rotating components of the engine.

Figure 2:
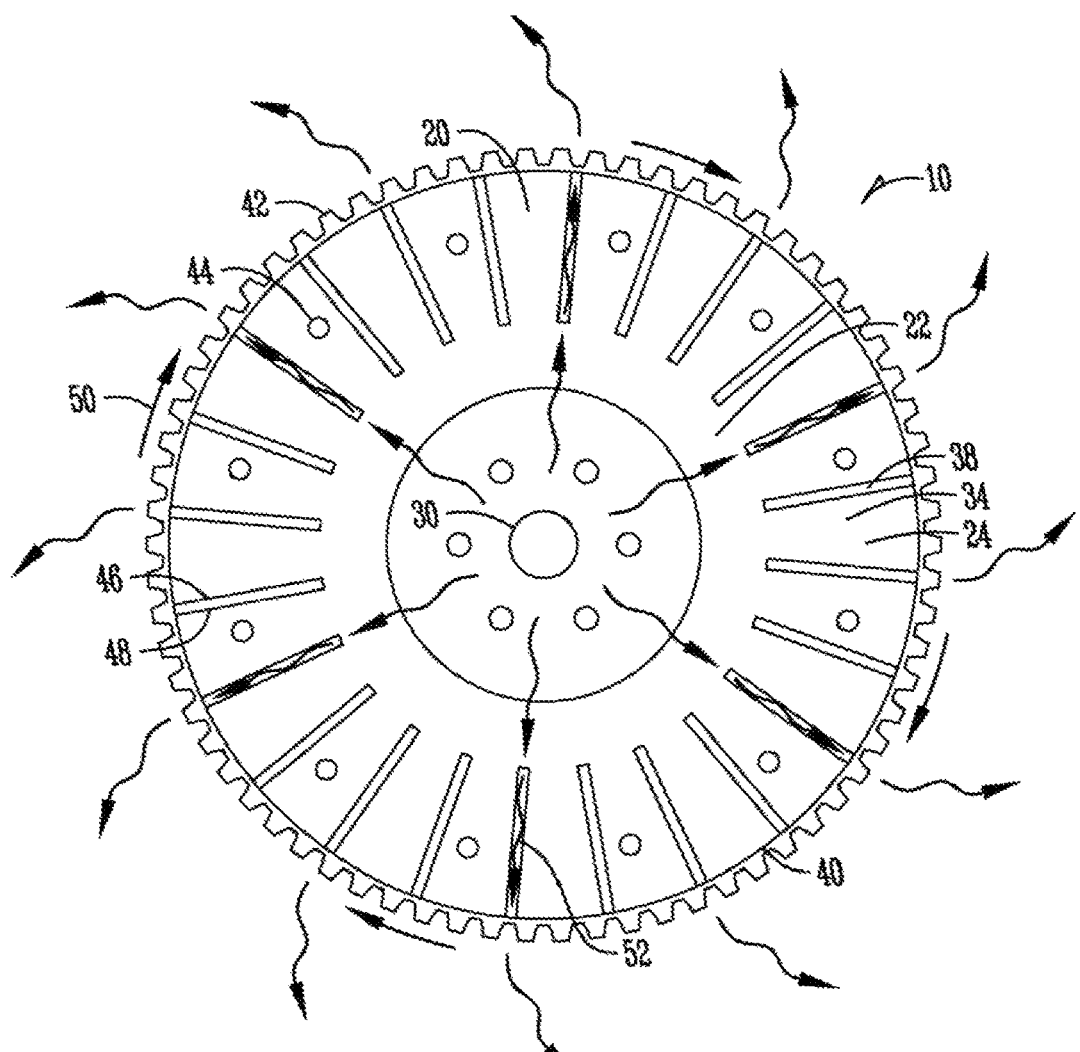
FIG. 2 is a plan view of a flywheel according to the present invention.
Figure 3:
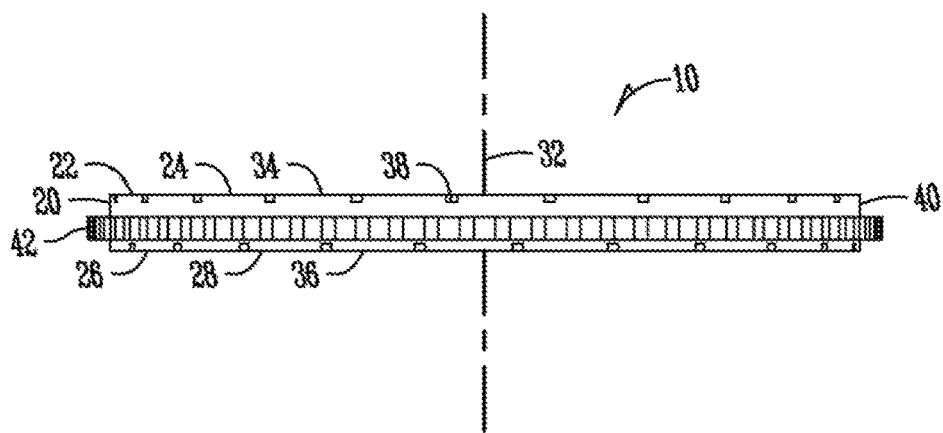
FIG. 3 is a side or end view of the flywheel of FIG. 2.

FIGS. 2 and 3 are a plan view and side or end view of a flywheel 10 according to the present invention. The flywheel 10 comprises a generally circular member 20, which is made from steel or other metal as is normal in the art. The flywheel 10 may be considered to have a clutch side 22 which engages the clutch disc 14 as shown in FIG. 1. The flywheel 10 may also have an engine side 26, which is adjacent the engine block 12 as shown in FIG. 1. It should be noted that the clutch side 22 and engine side 26 may be mirror images of one another, or they may be different.

FIG. 2 is a plan view of a flywheel 10 according to the present invention. FIG. 2 shows the clutch side 22 of the circular member 20 of the flywheel 10. As is known in the art, the flywheel 10 includes a gear portion 42 about the outer periphery of the circular member. The gear portion 42 is configured to engage an ignition system of an automobile, such that the gear portion 42 and ignition system work together to ignite or start the engine of an automobile. The flywheel 10 of FIG. 2 also includes a plurality of bolt holes 44 positioned both near the aperture 30 of the flywheel 10 and further out closer to the outer periphery of the flywheel 10. The inner bolt holes are configured to align with bolt holes of an engine block 12, as is shown in FIG. 1. The outer bolt holes are configured to align with connecting holes of the clutch assembly 16 as is shown in FIG. 1. Therefore, both the inner and outer bolt holes may vary according to engine type and clutch type, and it is contemplated as part of the present invention that the bolt holes may be selected depending on the engine and clutch type used in an automobile.

Also shown in FIG. 2 is a plurality of clutch fins 24 formed on the clutch side 22 of the circular member 20. The clutch fins 24 are formed by removing material from the clutch side 22 of the circular member 20. For example, a mill or other machine may be used to remove material, which forms grooves 38 in the clutch side 22 of the circular member 20. The grooves 38 define outer boundaries (first and second sides 46, 48) of a clutch fin face 34 between said grooves 38. Therefore, the clutch fin faces 34 are generally coplanar with the original surface of the clutch side 22 of the circular member 20. The number, size, shape, and angular orientation of the grooves relative to the center axis 32 of the flywheel 10 may be varied depending on the type of engine in which the flywheel 10 is going to be used, as well as to a user's desires or choices. For instance, a user may desire to have larger grooves 38 to create more air flow in order to remove more heat from within the engine assembly. However, a user may also want to use smaller grooves 38 such that a greater surface area of the clutch side 22 of the circular member 20 remains, such that the clutch disc 14 is able to properly work with the flywheel 10 and not slip in operation of the automobile.

Figure 5:
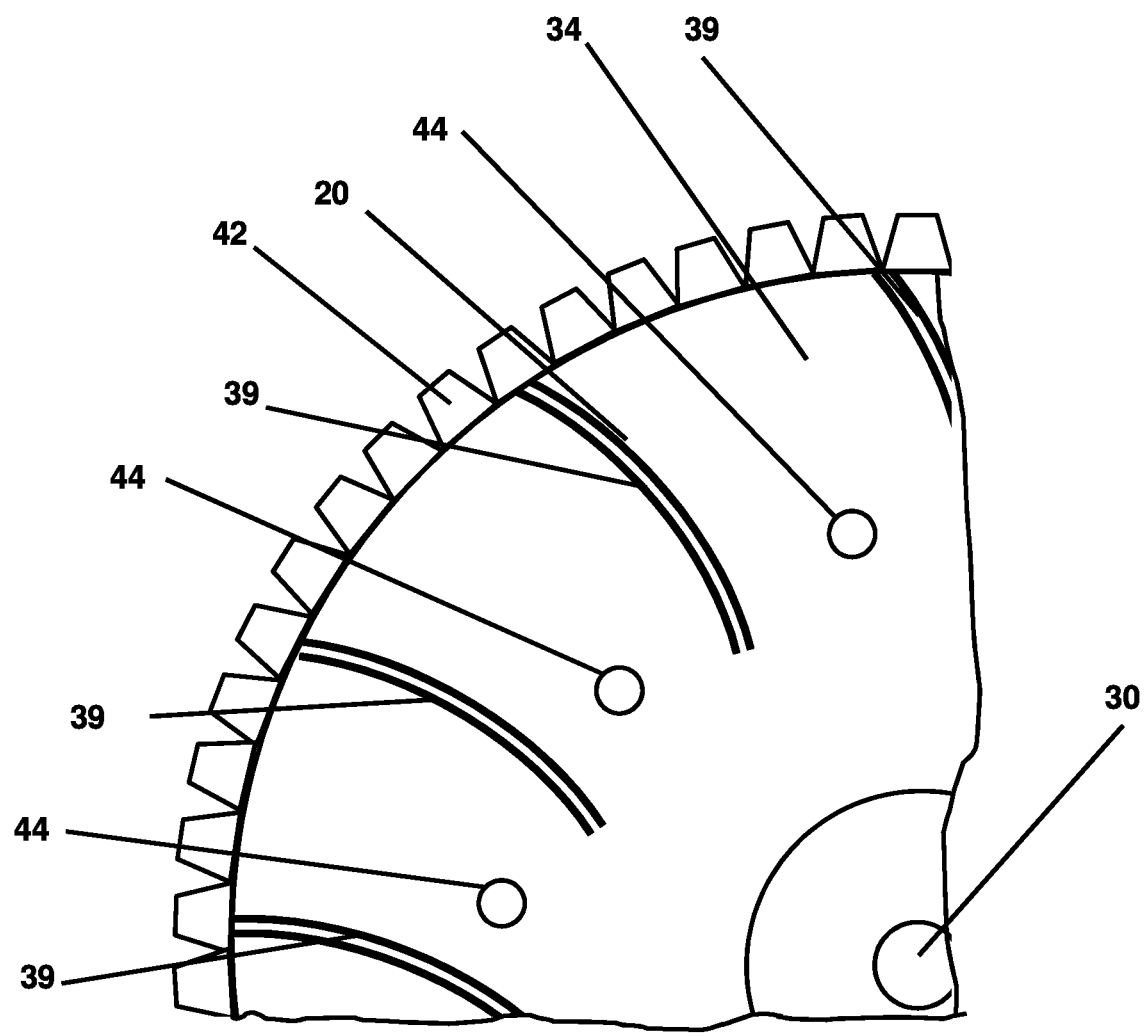
FIG. 5 is a plan view of a portion of a flywheel according to an alternative embodiment of the invention.

The fins 24 and grooves 38 on the clutch side 22 of the flywheel 10 are added to increase airflow through the clutch assembly 16 in the engine, and to create passageways for heat near the crank shaft to be removed from the engine assembly. This is shown by the arrows of FIG. 2. For example, the arrows generally designated by numeral 50 designate the rotation of the flywheel 10 during engine operation. While this angular rotation is occurring, heat builds up, especially near the center of the flywheel 10. Thus, it is desired for a cooling mechanism to be included with the flywheel 10. The grooves 38 allow the heat near the aperture 30 of the flywheel 10 to escape. This is shown by the arrows generally designated by numeral 52. Furthermore, the spinning of the flywheel 10 including the fins 24 creates a disruption in the air that increases the airflow towards the clutch disc 14 and clutch assembly 16. The cooling from the flywheel 10 and the release of heat may increase the life of the clutch assembly 16 by increasing the amount of time a clutch disc 14 may be used before warping of the clutch disc 14 occurs. Therefore, as noted above, while generally straight grooves 38 are shown in the FIG. 2, it should be appreciated that other designs for the grooves 38 and fins 24 are contemplated by the present invention and differing grooves and orientation of the grooves are considered to be part of the present invention. An example of such an embodiment is illustrated in FIG. 5. As shown, curved grooves 39 may be formed in the clutch fin face 34. It should also be noted that while material is removed from the circular member 20 and clutch or engine side of the flywheel 10 to form the grooves 38 and fins 24, enough surface area must remain in order for the flywheel 10 to properly work with the clutch disc 14.

FIG. 3 is an end or side view of the flywheel 10 of FIG. 2 showing both the clutch side 22 and engine side 26 of the flywheel 10. As is shown in FIG. 3, the flywheel 10 includes grooves 38 and fins 24 on both the engine and clutch sides 22, 26. The fins 24 are generally spaced radially about an axis 32 of an aperture 30 of the flywheel 10. It should also be noted that the grooves 38 forming the fins 24, 28 start generally near the outer edge or periphery 40 of the flywheel 10 and have a length generally less than the length of the clutch and engine sides 22, 26. Thus, the grooves 38 do not pass from one side of the flywheel 10 completely to the other. In addition to forming clutch fin faces 34 on the clutch side 22 of the flywheel 10, engine fin faces 36 are also formed on the engine side 26 of the flywheel. The flywheel 10 of FIG. 3 shows grooves 38 on both sides of the flywheel 10 to create clutch fins 24 and engine fins 28. Furthermore, it is shown that the grooves are offset from one another on each side. However, the exact orientation, size, and design of the grooves and fins may vary accordingly. Thus, the clutch fins 24 may be different than the engine fins 28. As the engine fins 28 are generally adjacent the engine block 12, they are used to provide a passageway for heat to escape the flywheel 10 between the flywheel 10 and engine block. It should be noted that the fins on both the clutch side 22 and the engine side 26 of the flywheel 10 are defined by the grooves 38, and include a first side 46 and an opposite side 48 and have a length extending from the outer edge 40 towards the center of the flywheel 10.

Figure 4:
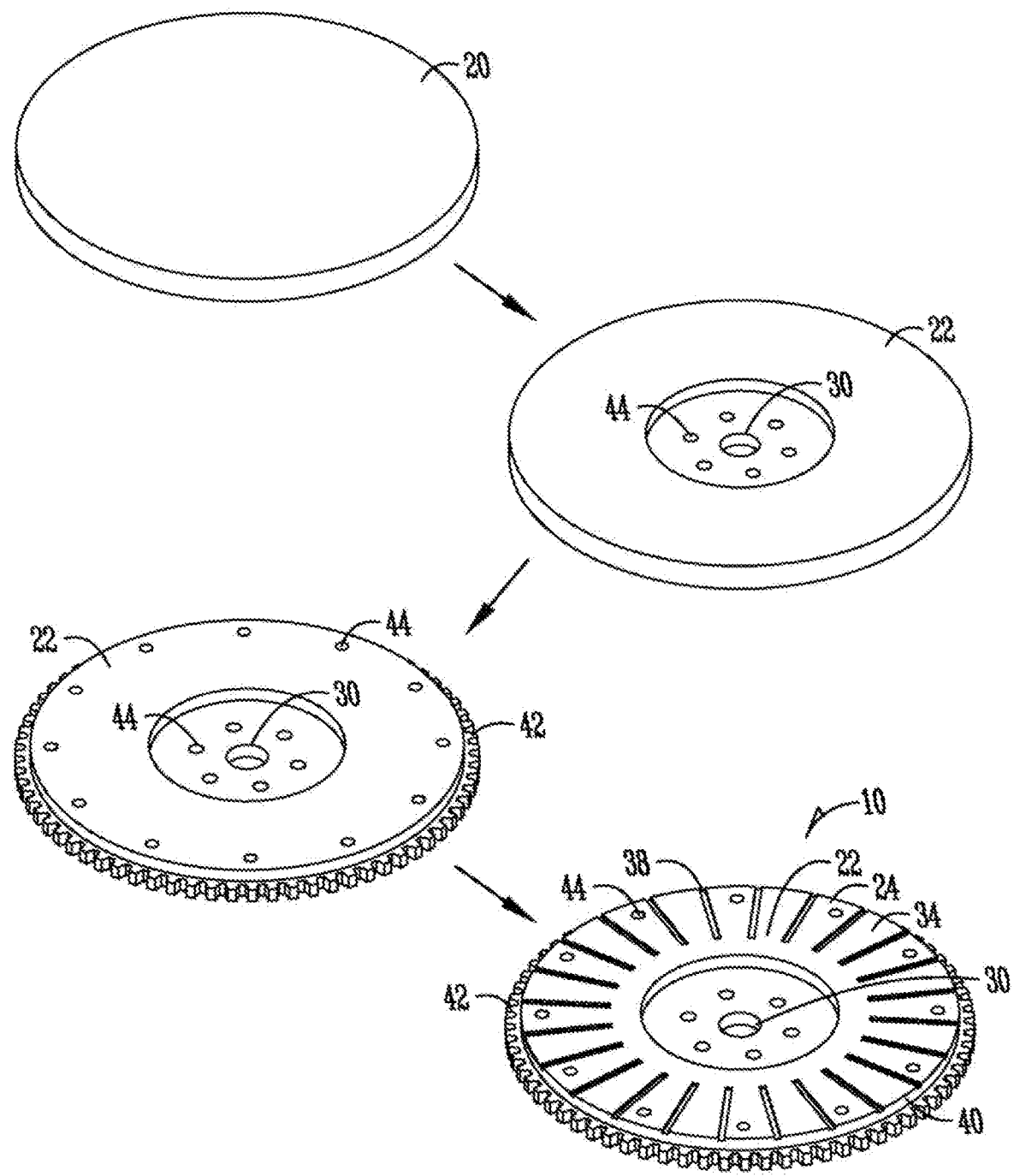
FIG. 4 shows the steps of a process of manufacturing a flywheel according to the present invention.

FIG. 4 shows the steps of a process of manufacturing a flywheel 10 according to one aspect of the present invention. More specifically, FIG. 4 shows the steps of one method of producing or manufacturing the flywheel 10 including the fins 24 and grooves 38 on one side of the flywheel 10. The flywheel 10 starts as a solid circular member 20 (it may also start as a sheet and cut to a circular shape). Next, the flywheel 10 is machined to create an aperture 30 through the center having a central axis 32. Material is removed near the central aperture 30 creating a recess and inner bolt holes 44 are machined through the circular member 20 as well. Next, the gear portion 42 may be added or machined into the outer periphery 40 of the circular member 20. The gear portion 42 is configured to interact with an ignition system of an automobile. Therefore, the gear portion 42 may be specific to a make and model of automobile. Also, as shown in FIG. 4, a plurality of outer bolt holes 44 are machined through the flywheel 10 to correspond with the clutch assembly 16 used with the flywheel 10. Next, fins are created in the clutch side 22 of the flywheel 10 by the addition of grooves 38 in the clutch side 22. The grooves 38 are formed by removing the material from the clutch side 22 of the flywheel 10. Thus, nothing is added to the actual flywheel 10 to create the fins, but instead, material is removed. Again, it should be appreciated that the determination of size, number, and angular orientation of the grooves 38 and fins 24 may be determinative upon the type of engine, including the type of clutch assembly 16 to which the flywheel 10 will be attached. For instance, certain material on the clutch side 22 of the flywheel 10 may need to be retained in order to function properly to power an automobile.

The fins 24 and grooves 38 may be created in the flywheel 10 by milling material from the flywheel 10. A mill, as is known in the art, may be programmed to remove material from the flywheel 10 in a desired pattern to leave the fins 24 or fin-like members in the flywheel 10. Because the fins 24 are machined or milled from the existing structure of the flywheel 10, the user does not need to attach the fins 24 or a separate sub-assembly to the flywheel 10. In other words, the fins 24 are an integral and robust feature of the flywheel 10, which increases the strength of the fins 24. In addition, as noted above, another set of fins 28 in grooves 38 maybe formed on the engine side 26 of the flywheel 10. However, fins on both sides of the flywheel 10 are not required.

The machining of the fins 24, 28 by removing material from the flywheel 10 negates the need to cast, stamp, or form the flywheel 10, all of which require the use of molds. The omission of the use of molds reduces the cost of the flywheel 10. The high amount of variability of the fin designs in the flywheel 10 will allow a fin to be designed and manufactured quickly and efficiently for multiple engines and clutch assemblies. Therefore, the flywheels 10 may be quickly manufactured to work with any number of engine types and clutch assembly types. Additionally, the present invention contemplates the use of a database containing a variety of predesigned fins. Therefore, a user would have the option of simply selecting the design from the database, which would be a program for the milling machine to create the fins and grooves.

The fins are robust because they are monolithic with the flywheel 10. No fastening or welding is needed. The designer would not remove too much material from the flywheel 10 so that the flywheel 10 would not meet its intended flywheel-clutch functions. It should be appreciated, however, that while machining a flywheel 10 to remove material may be preferred, other ways to create the fins may be provided as well. For instances, if an existing flywheel has been cast, stamped, machined, or the like, the fins may be cast or stamped with the flywheel or machine later as a finishing step. In addition, as noted above, the fins may be formed on one or both sides of the flywheel 10. Fins and grooves merely add a way to create airflow through the engine to aid in cooling the engine and more specifically, the clutch disc 14, in order to increase the life of the clutch disc 14.

The invention has been shown and described above with reference to the preferred embodiments, and it is understood that many modifications, substitutes, and additions may be made that are within the intended spirit and scope of the invention. The invention is only to be limited by claims pended hereto.

What is claimed is:

1. A method of manufacturing an engine flywheel for cooling a clutch assembly operably connected to the flywheel, comprising:
    providing a cylindrical engine flywheel having an engine side configured to be positioned adjacent an engine, and a clutch side configured to be positioned adjacent a clutch assembly;
    forming an aperture through the flywheel for operably attaching the flywheel to the engine; and,
    forming a plurality of clutch fins on the clutch side of the flywheel to cool the clutch assembly as the flywheel spins, the plurality of clutch fins having a face that is coplanar with the clutch side of the flywheel and wherein said face of each clutch fin has a surface area that is greater than a surface area of a bottom surface of a groove between two adjacent of said fins.

2. The method of claim 1 wherein the step of forming the plurality of fins comprises removing material from the clutch side of the flywheel.

3. The method of claim 2 wherein the step of removing material from the clutch side of the flywheel comprises milling the flywheel.

4. The method of claim 1 further comprising forming a gear portion about the periphery of the flywheel.

5. The method of claim 4 further comprising machining holes through the flywheel, the holes corresponding to the engine and clutch assembly.

6. The method of claim 1 wherein the plurality of fins are formed adjacent to an outer edge of the flywheel and spaced radially about the aperture.

7. The method of claim 1 further comprising removing material from the engine side of the flywheel to form a plurality of engine fins to further cool the clutch assembly.

8. The method of claim 1 further comprising forming straight grooves.

9. The method of claim 1 further comprising forming curved grooves.

10. The method of claim 1 further comprising forming said grooves in a radial direction.

11. The method of claim 1 further comprising fins on said engine side of said flywheel.

12. The method of claim 1, wherein said forming a plurality of clutch fins results in fins integral with said flywheel.

13. A method of manufacturing an engine flywheel for cooling a clutch assembly, comprising:

providing an engine flywheel having a circular shape with an engine side configured to be facing an engine and a clutch side configured to be facing a clutch assembly;

removing material from said clutch assembly side to form a plurality of grooves and define a plurality of clutch fins wherein said clutch fins each have a surface area which is greater than that of a bottom surface of each of said grooves and wherein said clutch fins have a surface coplanar with said clutch side of said flywheel;

forming an aperture through said engine flywheel to render said engine flywheel capable of being connected to an engine.

14. The method of claim 13, further comprising forming a gear portion about a periphery of said engine flywheel.

15. The method of claim 13, further comprising forming a plurality of holes corresponding to said engine and said clutch assembly.

16. The method of claim 13 further comprising forming said grooves with a straight shape.

17. The method of claim 13 further comprising forming said grooves with a curved shape.

18. The method of claim 13 further comprising forming fins on said engine side.

19. The method of claim 13, wherein said removing material is machining.

* * * * *